(12) United States Patent
Shimada et al.

(10) Patent No.: US 8,534,964 B2
(45) Date of Patent: Sep. 17, 2013

(54) DRILLING DEVICE WITH OIL SUPPLY UNIT

(75) Inventors: Keisuke Shimada, Tokyo (JP); Osamu Asano, Tokyo (JP); Toshiaki Hidaka, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 897 days.

(21) Appl. No.: 12/672,156

(22) PCT Filed: Jul. 23, 2008

(86) PCT No.: PCT/JP2008/063178
§ 371 (c)(1),
(2), (4) Date: Feb. 4, 2010

(87) PCT Pub. No.: WO2009/019982
PCT Pub. Date: Feb. 12, 2009

(65) Prior Publication Data
US 2011/0070041 A1    Mar. 24, 2011

(30) Foreign Application Priority Data
Aug. 7, 2007   (JP) ................................ 2007-205887

(51) Int. Cl.
*B23B 51/06*      (2006.01)
(52) U.S. Cl.
USPC ................................ 408/56; 408/98; 408/234
(58) Field of Classification Search
USPC ............................................. 408/56, 98, 234
IPC ....................................................... B23B 51/06
See application file for complete search history.

(56) References Cited

U.S. PATENT DOCUMENTS

| | | | | |
|---|---|---|---|---|
| 3,398,609 A | * | 8/1968 | Schott | 408/61 |
| 3,413,875 A | * | 12/1968 | Larson | 408/61 |
| 3,421,392 A | * | 1/1969 | Bangerter et al. | 408/57 |
| 3,546,976 A | * | 12/1970 | Urda et al. | 408/59 |

(Continued)

FOREIGN PATENT DOCUMENTS

| | | |
|---|---|---|
| DE | 4200808 A1 * | 9/1993 |
| EP | 1 947 339 A1 | 7/2008 |

(Continued)

OTHER PUBLICATIONS

International Search Report issued Oct. 28, 2008 in corresponding International Application No. PCT/JP2008/063178.

*Primary Examiner* — Eric A Gates
(74) *Attorney, Agent, or Firm* — Wenderoth, Lind & Ponack, L.L.P.

(57) ABSTRACT

A drilling device having an oil supply tank disposed at a position where the oil supply tank is less likely to collide with surrounding objects. This device includes a fixing member (12) fixed to a workpiece, a column (14) extending upward from the fixing member, a tubular slide unit (16) that is slidable along the column, a tool body (18) disposed on the tubular slide unit, and an oil supply tank (20) provided between the tool body and the fixing member and removably fixed to the tubular slide unit. The tool body is provided with a cutting oil supply passage having a cutting oil inlet (109) disposed toward the fixing member, while the oil supply tank is provided with a cutting oil outlet disposed upward. The tool body is displaced upward on the column and the oil supply tank is moved close to the tool body from the lower side of the tool body, whereby the cutting oil outlet of the oil supply tank is connected to the cutting oil inlet of the tool body.

15 Claims, 10 Drawing Sheets

(56) References Cited

U.S. PATENT DOCUMENTS

| | | | |
|---|---|---|---|
| 5,544,985 A * | 8/1996 | Lane | 408/56 |
| 5,747,762 A * | 5/1998 | Fukuda et al. | 200/61.45 R |
| 5,967,716 A * | 10/1999 | Katsuzawa et al. | 409/134 |
| 6,036,412 A * | 3/2000 | Dalla | 409/136 |
| 6,123,270 A * | 9/2000 | Hara | 239/8 |
| 6,126,368 A * | 10/2000 | Daubinger et al. | 408/61 |
| 2002/0159852 A1* | 10/2002 | Katsuzawa et al. | 409/135 |
| 2005/0105977 A1* | 5/2005 | Ishihara | 408/1 R |
| 2008/0008547 A1 | 1/2008 | Hidaka | |
| 2008/0286063 A1* | 11/2008 | Shimada | 409/136 |
| 2009/0162224 A1 | 6/2009 | Wakabayashi et al. | |

FOREIGN PATENT DOCUMENTS

| | | |
|---|---|---|
| EP | 1 771 227 B1 | 9/2009 |
| JP | 2006-22508 | 1/2006 |
| JP | 2006-26810 | 2/2006 |
| JP | 2006-61993 | 3/2006 |
| JP | 2006-192528 | 7/2006 |
| JP | 2007-132252 | 5/2007 |
| WO | 2006/009184 | 1/2006 |
| WO | 2006/075548 | 7/2006 |
| WO | WO 2006075548 A1 * | 7/2006 |
| WO | 2007/055136 | 5/2007 |

* cited by examiner

DRILLING DEVICE WITH OIL SUPPLY UNIT

TECHNICAL FIELD

The present invention relates to a drilling device with an oil supply unit.

BACKGROUND ART

There is known a drilling device including a fixing member fixable to a workpiece by means of an electromagnet and a cutting oil supply unit for supplying cutting oil to a cutting tool (see Japanese Unexamined Patent Application Publication No. 2006-061993).

A cutting oil supply unit in such a drilling device has an oil supply tank, which tends to collide with surrounding objects to be damaged in transportation and use of the drilling device. Therefore, it is required that the oil supply tank be disposed at a position where the oil supply tank is less likely to suffer such damage.

In a cutting tool disclosed in the above-mentioned Japanese Unexamined Patent Application Publication No. 2006-061993, an oil supply tank is configured to be disposed in a space between an electromagnetic fixing member and a cutting edge drive unit attached above the fixing member.

Patent Document 1: Japanese Unexamined Patent Application Publication No. 2006-061993
Patent Document 2: Japanese Unexamined Patent Application Publication No. 2007-132252

DISCLOSURE OF THE INVENTION

Problems to be Solved by the Invention

In the drilling device disclosed in Japanese Unexamined Patent Application Publication No. 2006-061993, the oil supply tank is disposed as described above and therefore is less likely to be damaged. However, damage is unavoidable, and thus the oil supply tank needs to be replaced appropriately. Therefore, it is necessary to enable the oil supply tank to be easily replaced as well as to be surely connected to an oil supply passage of a tool body.

It is an object of the present invention to provide a drilling device with an oil supply tank which enables such replacement and connection.

Means for Solving the Problems

The present invention provides a drilling device with an oil supply unit which includes a fixing member configured to be removably fixed to a workpiece, a column extending upward from the fixing member, a tubular slide unit provided around the column so as to be slidable along the column, a tool body connected to the upper end portion of the tubular slide unit, and an oil supply tank provided between the tool body and the fixing member and removably fixed to the tubular slide unit. The tool body includes a cutting tool and a cutting oil supply passage which has a cutting oil inlet for receiving cutting oil from the oil supply tank and feeds the received cutting oil to the cutting tool. The cutting oil inlet is directed downward toward the fixing member. The oil supply tank has a cutting oil outlet directed upward and fluidly connected to the cutting oil inlet. The oil supply tank is configured to be moved toward the tool body, which has been displaced upward on the column from the lower side of the tool body while the cutting oil outlet is aligned with the cutting oil inlet in the vertical direction so that the cutting oil outlet of the oil supply tank is connected to the cutting oil inlet of the tool body.

In this drilling device, in a state in which the tool body is at the upper position, the oil supply tank can be easily attached. In a state in which the tool body is moved back to the lower position such that the oil supply tank is sandwiched between the tool body and the fixing member, the oil supply tank can be securely fixed and suppressed from being damaged by collision with surrounding objects. In attaching the oil supply tank, the oil supply tank is set under the tool body and then moved upward. Therefore, it is possible to reduce lateral protuberances of the oil supply tank and thus to further suppress the above-mentioned damage of the tank.

Further, this drilling device may be arranged as follows. The tool body includes a pressurized air supply unit. The pressurized air supply unit has a pressurized air supply passage for supplying pressurized air to the oil supply tank. The pressurized air supply passage has a pressurized air outlet connected to the oil supply tank. The pressurized air outlet is directed downward toward the fixing member. The oil supply tank has a pressurized air inlet directed upward and communicated with the pressurized air outlet. The oil supply tank receives pressurized air from the pressurized air supply unit to pressurize the inside of the oil supply tank so that cutting oil is discharged from the cutting oil outlet and supplied through the cutting oil supply passage to the cutting tool. The oil supply tank is configured to be moved toward the tool body, which has been displaced upward on the column, from the lower side of the tool body in a state in which the cutting oil outlet and the pressurized air inlet are aligned with the cutting oil inlet and the pressurized air outlet in the vertical direction, respectively, so that the cutting oil outlet and the pressurized air inlet of the oil supply tank are connected to the cutting oil inlet and the pressurized air outlet of the tool body, respectively.

Specifically, the drilling device may be arranged as follows. The tool body has a plug projecting from the tool body toward the fixing member. The cutting oil inlet and the pressurized air outlet are disposed in parallel with each other in the plug while being directed downward. The oil supply tank has a socket configured to engage with the plug of the tool body. The cutting oil outlet and the pressurized air inlet are disposed in parallel with each other in the socket while being directed upward. The oil supply tank is configured to be moved toward the tool body from the lower side of the tool body to engage the socket with the plug so that the cutting oil outlet and the pressurized air inlet of the oil supply tank are connected to the cutting oil inlet and the pressurized air outlet of the tool body, respectively.

In this drilling device, the oil supply tank is pressurized by pressurized air, whereby cutting oil is discharged from the oil supply tank and supplied to the tool. The connecting point of the oil supply line and that of the pressurized air supply line between the oil supply tank and the tool body are disposed in one place, whereby these lines are connected and disconnected at the same time. These lines are connected and disconnected by engagement and disengagement of the socket and the plug.

More specifically, the drilling device may be arranged as follows. The tubular slide unit includes a slit extending along the longitudinal direction of the tubular slide unit, a pair of fixing pieces extending radially outward so as to oppose each other across the slit, and a clamping unit having an operating member mounted on the pair of the fixing pieces and extending outward from one of the pair of fixing pieces. By operating the operating member, the fixing pieces are moved close to each other to fix the tubular slide unit to the column, and are moved away from each other to enable the tubular slide unit to slide along the column. The oil supply tank includes a tank body for storing cutting oil, which is disposed so as to oppose the column across the fixing pieces, and a tank attachment member fixed to the lateral side of the tank body corresponding to the other of the pair of fixing pieces. The tank attached member extends toward the tubular slide unit to be fixed to the tubular slide unit. The cutting oil outlet is formed in the tank attachment member.

The tool body may include a casing fixed to the upper end of the tubular slide unit, and an electric drill portion positioned on the side of the tubular slide unit diametrically opposite to the side on which the pair of fixing pieces are provided. The electric drill portion is vertically displaceable relative to the casing. The tubular slide unit may have a guide groove to guide the electric drill portion in the vertical direction.

Further, the tubular slide unit may include a guide groove forming portion extending on the diametrically opposite side of the tubular slide unit with respect to the pair of fixing pieces and forming the guide groove. The tank attachment member may be fixed to the lateral side of the guide groove forming portion.

In addition, the tank body may include a portion disposed so as to oppose the tubular slide unit across the pair of fixing pieces, and an extending portion extending between the other of the pair of fixing pieces and the tank attachment member from the portion toward the guide groove forming portion.

The present invention also provides a drilling device with an oil supply unit which includes an oil supply tank and a cutting oil supply passage for supplying cutting oil from the oil supply tank to a cutting tool. The drilling device also includes a pressurized air supply unit for supplying pressurized air into the oil supply tank so that the oil supply tank is pressurized by pressurized air to supply cutting oil from the oil supply tank to the cutting oil supply passage.

Generally, in this type of drilling device, a pump is provided in a cutting oil supply passage from the oil supply tank to the cutting tool, and the pump sucks cutting oil from the oil supply tank and supplies the cutting oil to the cutting tool. Meanwhile, in the drilling device according to the present invention, since the device is arranged as described above, cutting oil does not flow through the pump. Therefore, it is possible to avoid problems, such as that the pump is blocked with dirt contained in cutting oil, and that cutting oil freezes in the pump to break the pump in the winter season.

BEST MODE FOR CARRYING OUT THE INVENTION

An embodiment of a drilling device according to the present invention will now be described with reference to the accompanying drawings.

Figure 3:
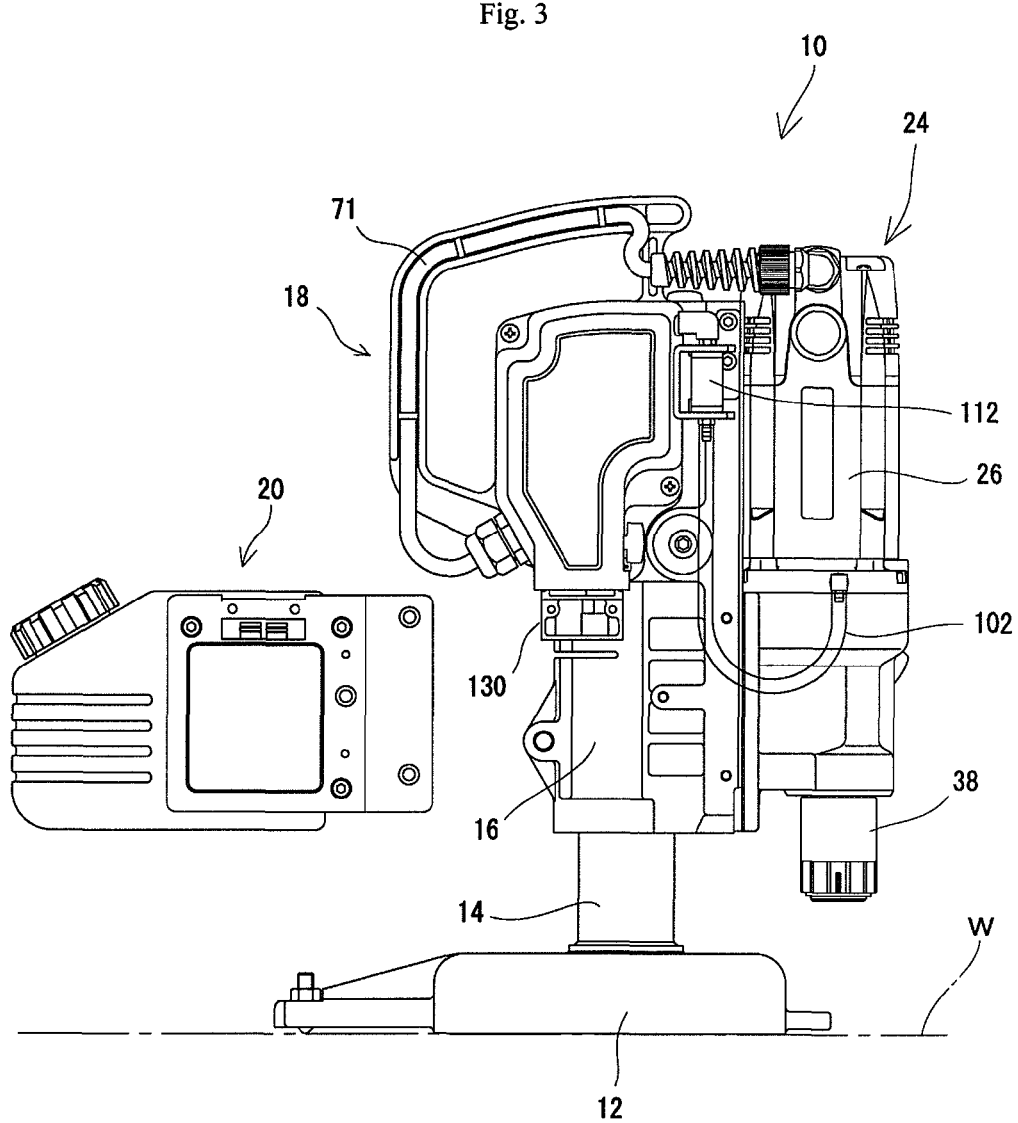
FIG. 3 is a front view of the drilling device, showing a state in which an oil supply tank 20 is removed.

As shown in the figures, a drilling device 10 according to the present invention includes a fixing member 12 removably fixed to a workpiece W by means of an electromagnet, a column 14 (FIGS. 3 and 4) vertically extending from the fixing member 12, a tubular slide unit 16 provided around the column so as to be slidable along the column, a tool body 18 connected onto the upper end portion of the tubular slide unit 16, and an oil supply tank 20 provided between the tool body 18 and the fixing member 12, and removably fixed to the tubular slide unit.

Figure 2:
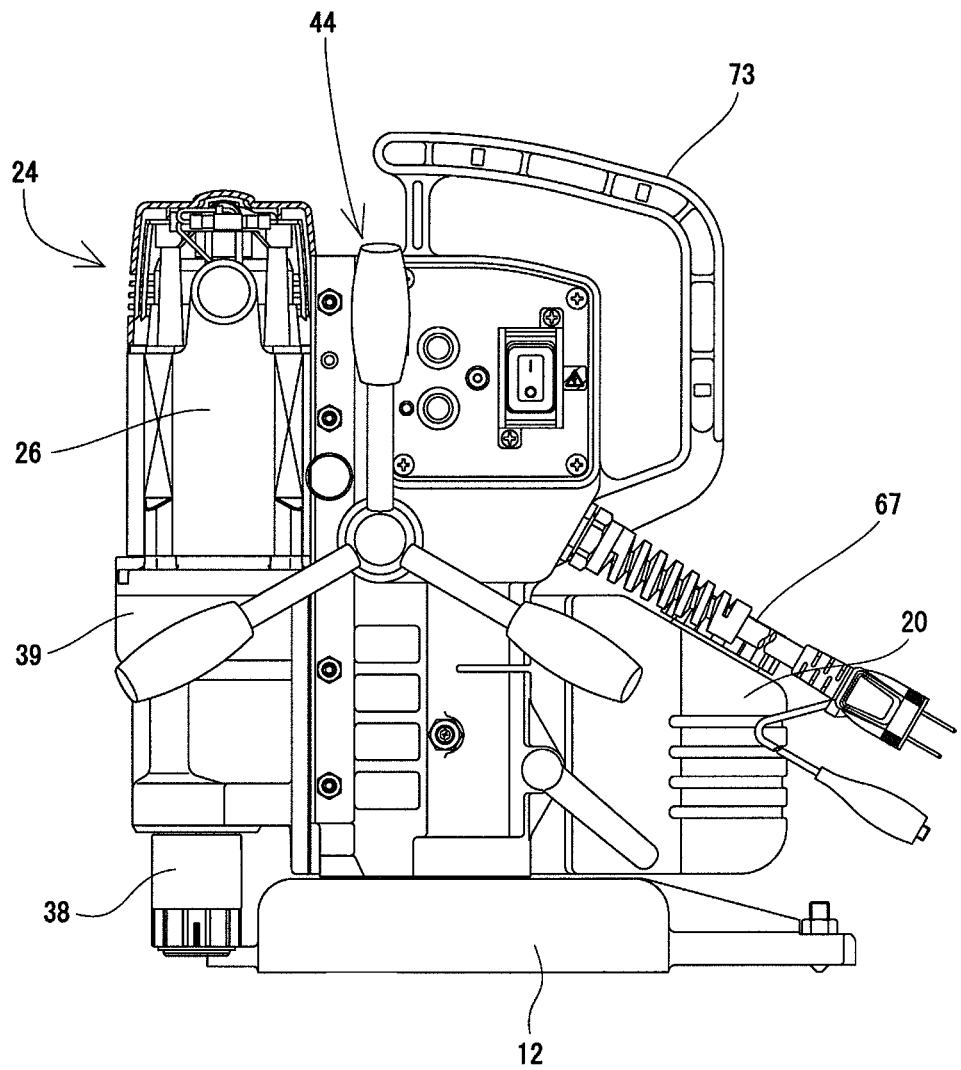
FIG. 2 is a rear view of the drilling device.
Figure 4:
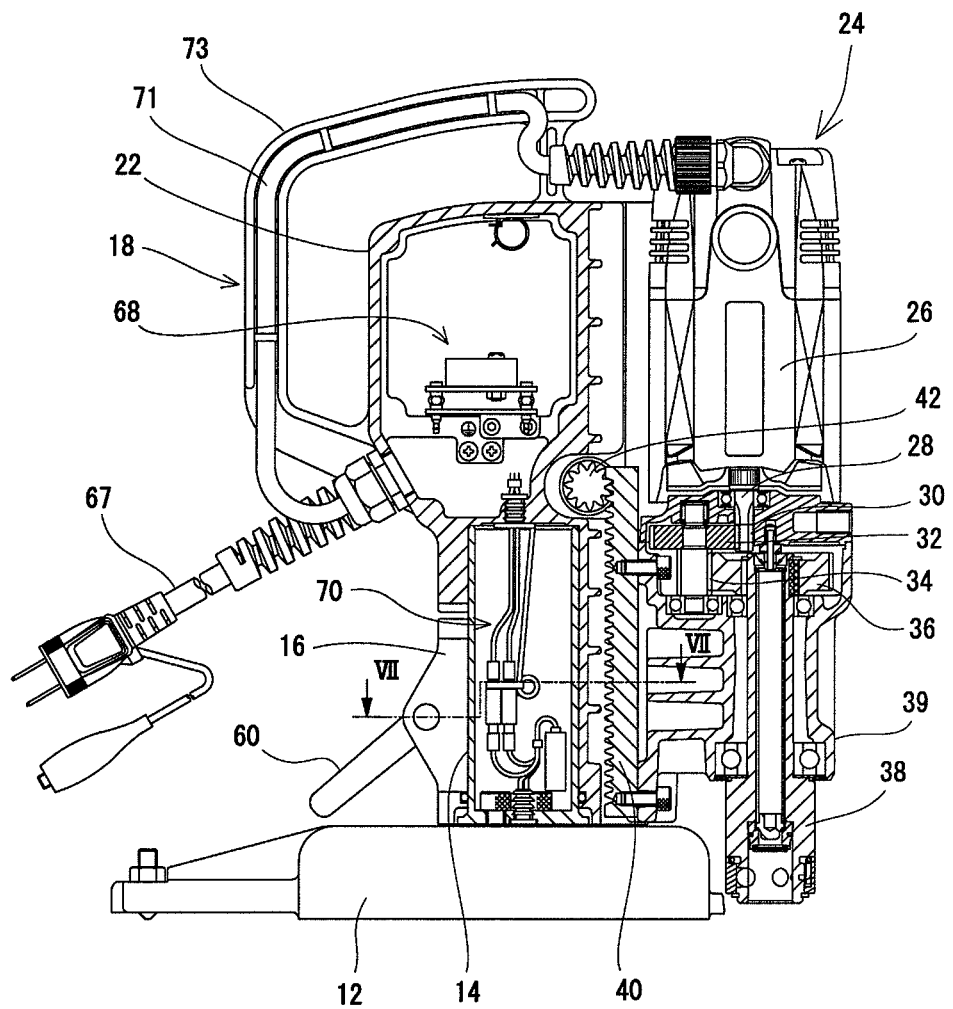
FIG. 4 is a partially sectional front view of the drilling device in FIG. 1 in a state in which the oil supply tank is not attached thereto.
Figure 5:
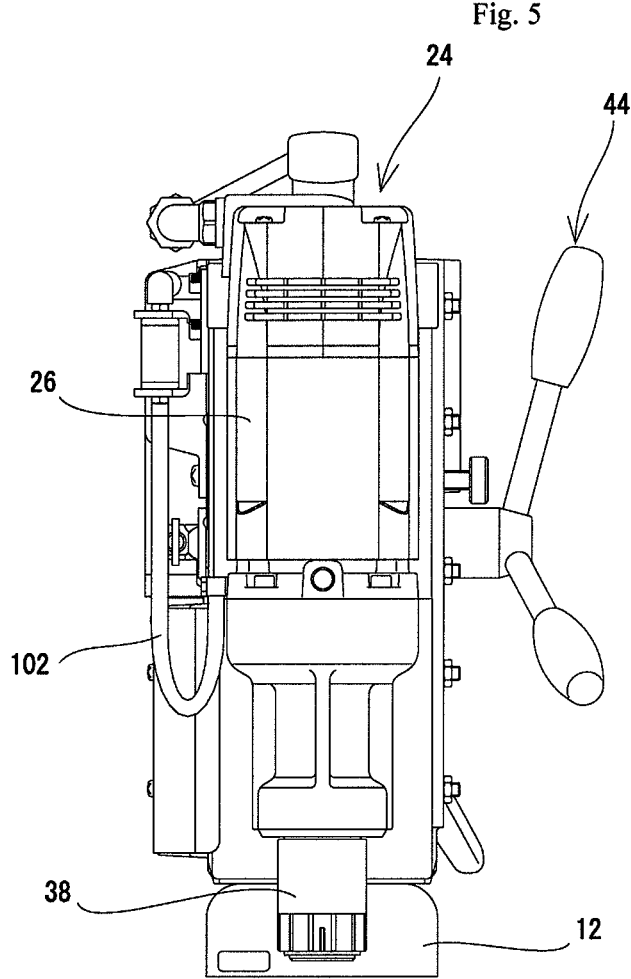
FIG. 5 is a right side view of the drilling device in FIG. 1.
Figure 6:
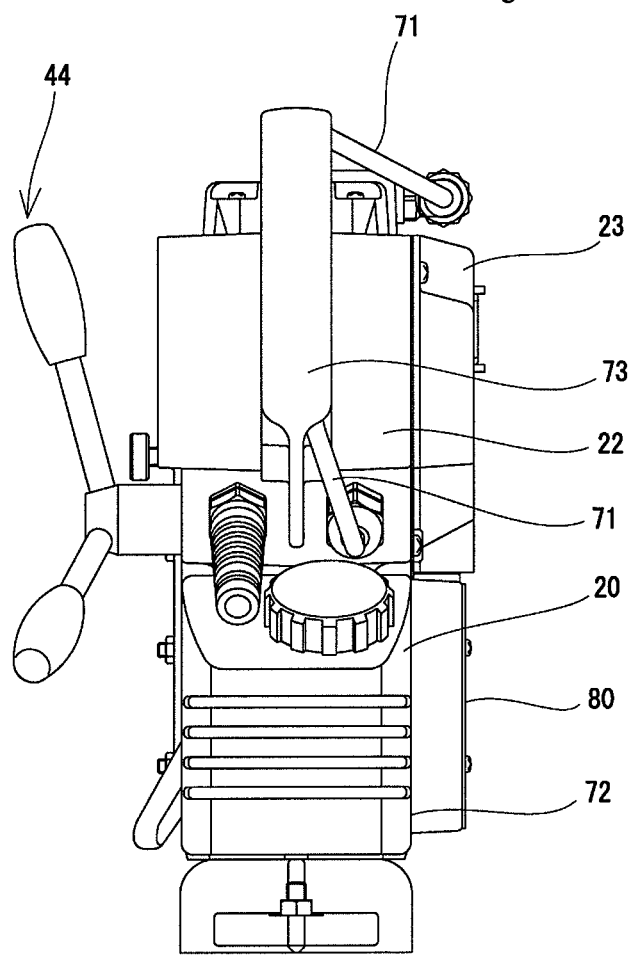
FIG. 6 is a left side view of the drilling device in FIG. 1.
Figure 7:
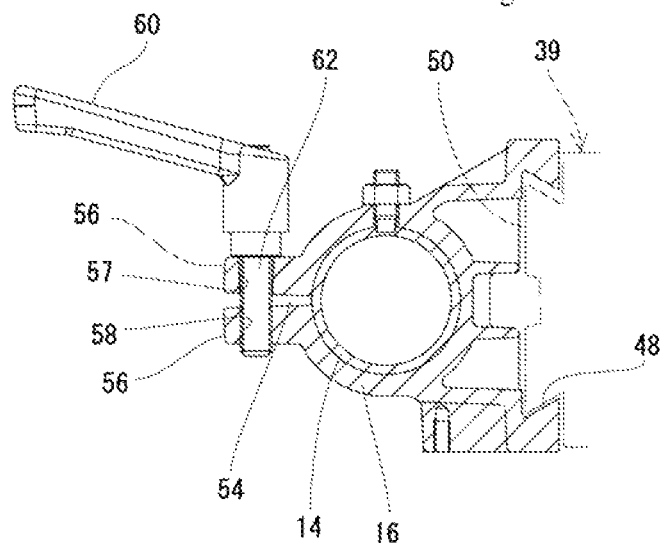
FIG. 7 is a sectional view of FIG. 4 taken along line VII-VII.

The tool body 18 has a casing 22 (FIG. 4) formed integrally with the upper end portion of the tubular slide unit 16, and an electric drill portion 24 vertically displaceably disposed on the right side of the casing as viewed in FIG. 4. The electric drill portion 24 has an electric motor 26, and is configured to rotationally drive an arbor 38 through an output shaft 28 of the electric motor and gears 30, 32, 34, and 36. The arbor 38 is configured such that a tubular cutter (not shown) can be attached to the lower end thereof coaxially with the arbor. A rack 40 (FIG. 4) is fixed to a housing 39 of the electric drill portion 24. The rack is engaged with a pinion 42 rotatably attached to the casing 22 of the tool body. The electric drill portion 24 can be vertically moved by rotating the pinion 42 by means of a handle 44 shown in FIG. 2. As shown in FIG. 7, a guide groove 48 having a dovetail cross section is formed in the tubular slide unit 16 so as to extend vertically, and a dovetail-shaped convex portion 50 formed in the housing 39 of the electric drill portion is slidably engaged with the guide groove 48. Thus, the electric drill portion is guided by means of the guide groove 48.

As shown in FIGS. 4 and 7, the tubular slide unit 16 has a slit 54 extending from the lower end to the vicinity of the upper end thereof in the axial direction of the tubular slide unit 16. The tubular slide unit also has a pair of fixing pieces 56 radially outward extending so as to oppose each other across the slit. A threadless hole 57 and a threaded hole 58, which are aligned with each other, are formed in the respective fixing pieces. A clamping screw 62 rotated by a lever 60 is inserted into the threadless hole 57 and threadedly engaged with the threaded hole 58. Thus, the fixing pieces 56 are moved close to and away from each other by rotating the lever 60, whereby the tubular slide unit 16 (that is, the tool body 18) is tightened against the column 14 to be fixed to the column and is allowed to slide along the column. In FIG. 4, reference numeral 67 denotes a connecting code connected to a power source; reference numeral 68 denotes a part of a switching unit for the electric motor 26 of the electric drill portion 24 and an electromagnet (not shown) of the fixing member 12; reference numeral 70 denotes a power supply line to the electromagnet; and reference numeral 71 denotes a power supply line to the electric drill 24, which is disposed along a grip 73 attached to the casing 22 of the tool body 18.

Figure 1:
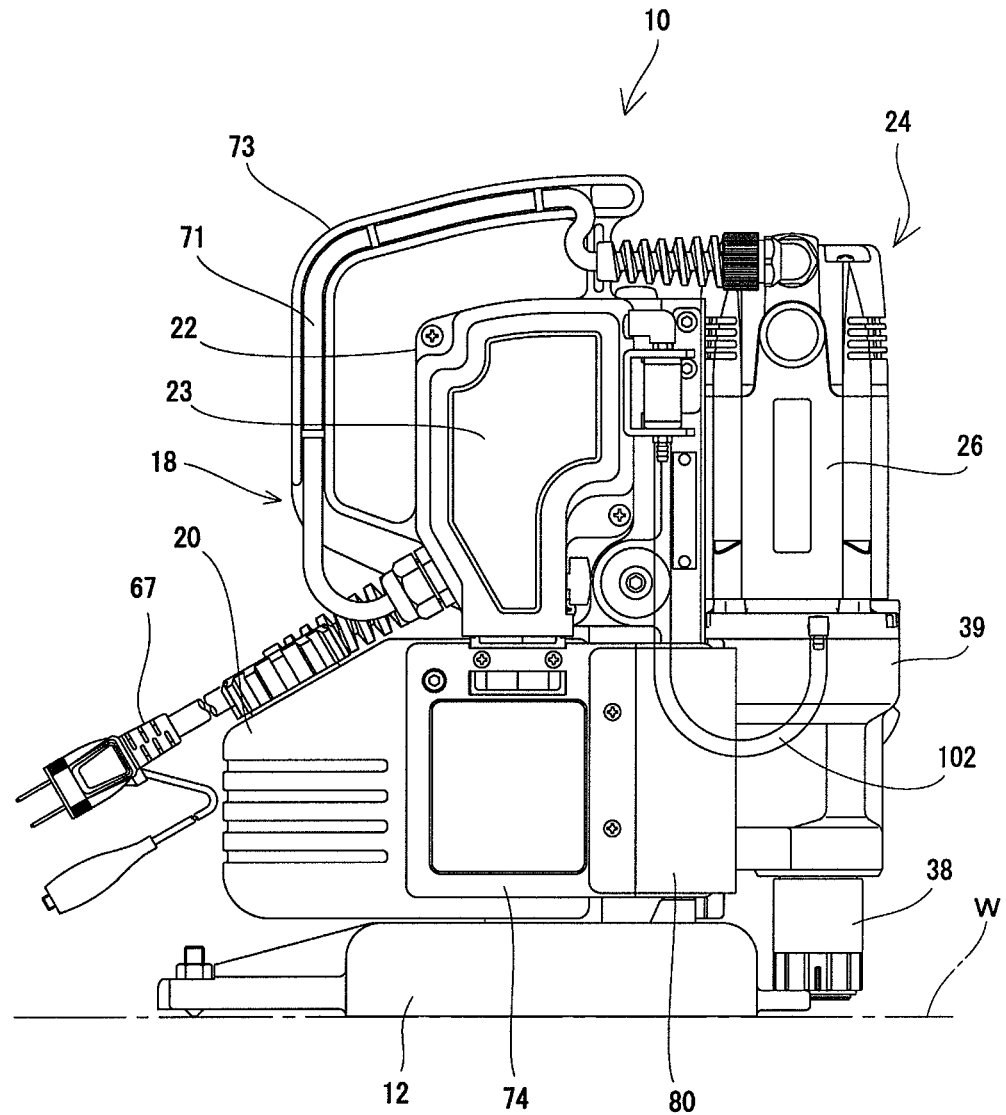
FIG. 1 is a front view of a drilling device 10 according to the present invention.
Figure 8:
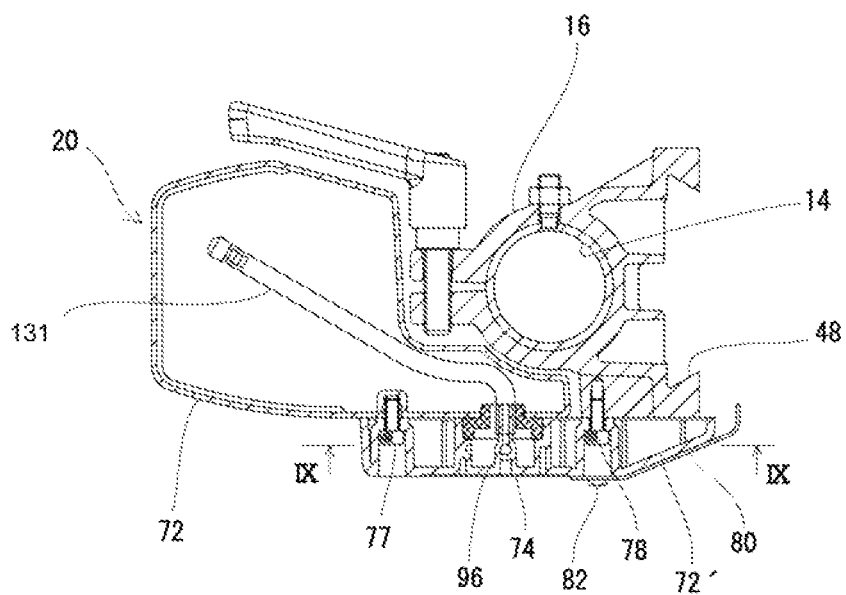
FIG. 8 is a sectional view of the drilling device, with the oil supply tank attached thereto, taken along line VII-VII in FIG. 4.
Figure 9:
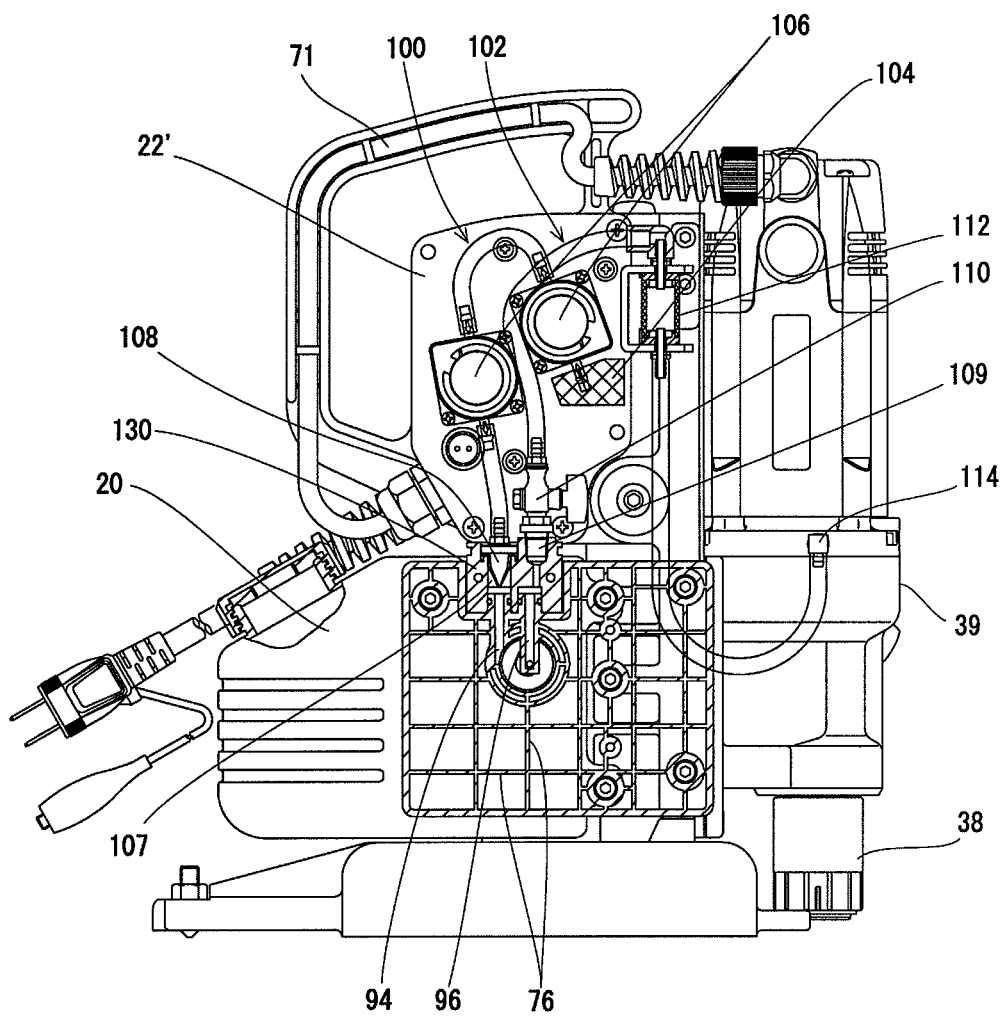
FIG. 9 shows the drilling device in FIG. 1, with a cover of a casing of a tool body removed, in which a tank attachment member of the oil supply tank is sectioned along line IX-IX in FIG. 8.
Figure 10:
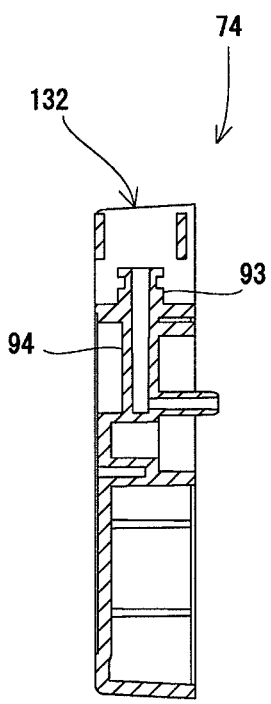
FIG. 10 is a sectional view of the tank attachment member taken along a cutting oil passage formed in the tank attachment member.

FIG. 8 is a sectional view of the drilling device 10, with the oil supply tank 20 attached thereto, taken along line VII-VII in FIG. 4. As shown in the figure, the oil supply tank 20 has a tank body 72 provided so as to surround a part of the tubular slide unit 16, and a tank attachment member 74 fixed to the side surface of the tank body by means of bolts 77. As can be seen in FIG. 9 showing the tank attachment member 74 in section taken along line IX-IX in FIG. 8, and FIG. 1, the tank attachment member 74 is generally quadrangular in shape and reinforcing ribs 76 are formed as a grid when the oil supply tank 20 is viewed from the front side, and bolts 78 are inserted into an extending portion 72' extending from the tank body 72 to fix the tank attachment member to the tubular slide unit 16. A chip cover 80 for protecting the tank attachment member from chips generated in drilling operation is attached by means of screws 82 to the extending portion 72' disposed on the electric drill side of the tank attachment member 74. As shown in FIGS. 9 and 10, the tank attachment member 74 is provided with an air passage 94 which extends vertically downward from a pressurized air inlet 93 opening upward at the vicinity of the upper edge of the tank attachment member and which is connected at the lower end thereof to an opening (not shown) formed in the side wall of the tank body 72. The tank attachment member is also provided with a cutting oil passage 96 (similar to the air passage 94) formed so as to parallel to the air passage 94.

Correspondingly, a side wall outer surface 22' of the casing 22 of the tool body 18 is provided with a pressurized air supply passage 100 and a cutting oil supply passage 102 as shown in FIG. 9. The pressurized air supply passage 100 and the cutting oil supply passage 102 are communicated with the air passage 94 and the cutting oil passage 96, respectively.

The pressurized air supply passage 100 extends from an air filter 104, through two unimorph pumps (piezoelectric pumps) 106, to a pressurized air outlet 107 having a duckbill check valve 108. Meanwhile, the cutting oil supply passage 102 extends from a cutting oil inlet 109 communicated with an upper end outlet of the cutting oil passage 96, i.e., a cutting oil outlet, through an on-off valve 110 and an oil dropper 112, to a cutting oil discharge/supply port 114 communicated with a cutting oil receiving port formed in the outer surface of the housing 39 of the electric drill. The oil dropper 112 is a transparent tubular member, by which a flow of cutting oil can be checked from the outside. A cover 23 (FIG. 1) is removably attached to the side wall outer surface 22' to protect the pressurized air supply passage 100 and the cutting oil supply passage 102.

Figure 12:
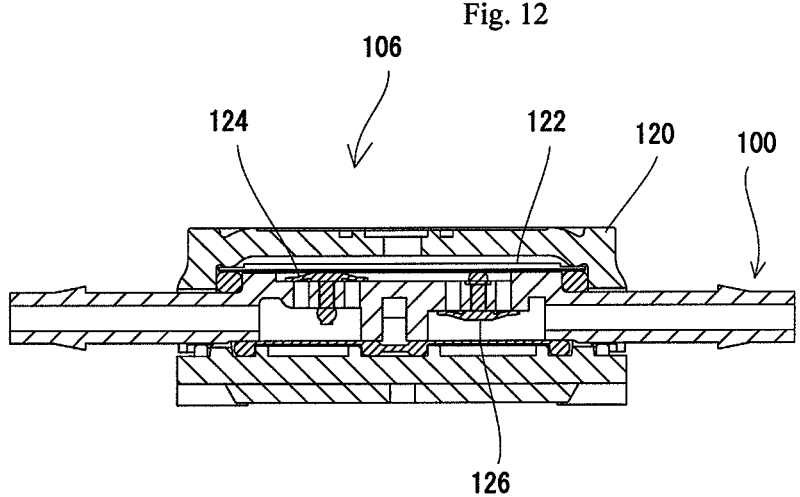
FIG. 12 is a sectional view of a unimorph pump.

FIG. 12 is a sectional view of the unimorph pump 106. A unimorph sheet 122 is stretched in a casing 120. When an alternating voltage is applied to the unimorph sheet, the unimorph sheet vibrates, thereby generating an air flow through check valves 124 and 126 in the pressurized air supply passage 100. This unimorph pump is disclosed, for example, in Japanese Unexamined Patent Application Publication No. 2007-132252, and therefore detailed descriptions thereof are omitted here.

Pressurized air received in the air passage 94 from the pressurized air supply passage 100 is supplied into the oil supply tank 20 to increase the internal pressure of the oil supply tank. Thus, cutting oil in the oil supply tank is supplied to the cutting oil supply passage 102 through a tube 131, the distal end of which is immersed in cutting oil, and the cutting oil passage 96.

Figure 11:
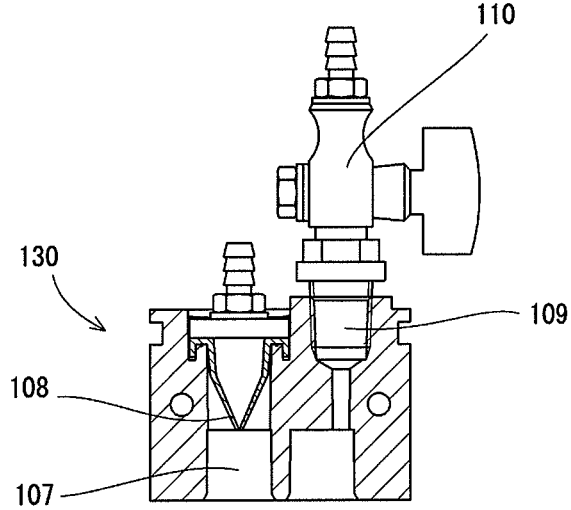
FIG. 11 is a partial sectional view of a plug removed from the tool body.

In the illustrated embodiment, a plug 130 is provided at the lower end edge of the side wall of the casing 22 of the tool body 18 so as to downward project from the lower end edge. The air outlet 107 with the check valve 108 of the pressurized air supply passage 100 and the cutting oil inlet 109 of the cutting oil supply passage 102 are provided in the plug 130 so as to be parallel to each other. FIG. 11 shows the plug 130 removed from the casing 22. As clearly shown in the figure, the check valve 108 is a duckbill valve. Meanwhile, a socket 132 for receiving the plug 130 is formed on the upper end surface of the tank attachment member 74. The socket has upper end portions of the air passage 94 and the cutting oil passage 96. The plug 130 and the socket 132 are fitted to each other, whereby the air passage 94 and the cutting oil passage 96 are communicated with the pressurized air supply passage 100 and the cutting oil supply passage 102, respectively.

In this drilling device, when the oil supply tank is replaced, the lever 60 is rotated in the clockwise direction from the position shown in FIG. 4 so that the pair of fixing pieces 56 of the tubular slide unit 16 are moved away from each other to loosen the tubular slide unit 16 from the column 14, and then the tubular slide unit 16 (that is, the tool body 18) is lifted up. The chip cover 80 is removed from the tank attachment member 74 of the oil supply tank 20 to expose the bolts 78 fixing the tank attachment member 74 to the tubular slide unit 16. Then, the bolts 78 are removed, and then the oil supply tank 20 is moved downward, whereby the socket 132 of the tank attachment member 74 is disengaged from the plug 130 of the casing 22 of the tool body 18. Thus, the oil supply tank 20 is disconnected from the pressurized air supply passage 100 and the cutting oil supply passage 102. After that, a replacement oil supply tank is set below the casing of the tool body and then lifted up, whereby the socket 132 and the plug 130 are fitted to each other. Thus, this oil supply tank 20 is communicated with the pressurized air supply passage 100 and the cutting oil supply passage 102. After that, the oil supply tank 20 is fixed to the tubular slide unit 16 by means of the bolts 78. Then, the tubular slide unit (that is, the tool body 18) is slidably moved downward along the column 14 so that the attached oil supply tank 20 is clamped between the casing 22 of the tool body and the fixing member 12. Then, the chip cover 80 is attached.

The invention claimed is:

1. A drilling device with an oil supply unit, comprising:
    a fixing member configured to be removably fixed to a workpiece;
    a column extending upward from the fixing member;
    a tubular slide unit provided around the column so as to be slidable along the column;
    a tool body connected to an upper end portion of the tubular slide unit; and,
    an oil supply tank provided between the tool body and the fixing member and removably fixed to the tubular slide unit,
    wherein the tool body includes a cutting tool and a cutting oil supply passage which has a cutting oil inlet for receiving cutting oil from the oil supply tank and feeds the received cutting oil to the cutting tool, the cutting oil inlet being directed downward toward the fixing member;
    wherein the oil supply tank has a cutting oil outlet directed upward and fluidly connected to the cutting oil inlet; the oil supply tank being configured to be moved toward the tool body, which has been displaced upward on the column, from a lower side of the tool body while the cutting oil outlet is aligned with the cutting oil inlet in a vertical direction so that the cutting oil outlet of the oil supply tank is connected to the cutting oil inlet of the tool body.

2. A drilling device with an oil supply unit according to claim 1, wherein:
    the tool body includes a pressurized air supply unit having a pressurized air supply passage for supplying pressurized air to the oil supply tank, the pressurized air supply passage having a pressurized air outlet connected to the oil supply tank, the pressurized air outlet being directed downward toward the fixing member;

the oil supply tank has a pressurized air inlet directed upward and communicated with the pressurized air outlet, the oil supply tank receiving pressurized air from the pressurized air supply unit to pressurize the inside of the oil supply tank so that cutting oil is discharged from the cutting oil outlet and supplied through the cutting oil supply passage to the cutting tool; and the oil supply tank being configured to be moved toward the tool body, which has been displaced upward on the column, from the lower side of the tool body in a state in which the cutting oil outlet and the pressurized air inlet are aligned with the cutting oil inlet and the pressurized air outlet in the vertical direction, respectively, so that the cutting oil outlet and the pressurized air inlet of the oil supply tank are connected to the cutting oil inlet and the pressurized air outlet of the tool body, respectively.

3. A drilling device with an oil supply unit according to claim 2, wherein:

the tool body has a plug projecting from the tool body toward the fixing member, the cutting oil inlet and the pressurized air outlet being disposed in parallel with each other in the plug while being directed downward;

the oil supply tank has a socket configured to engage with the plug of the tool body, the cutting oil outlet and the pressurized air inlet being disposed in parallel with each other in the socket while being directed upward; and, the oil supply tank is configured to be moved toward the tool body from the lower side of the tool body to engage the socket with the plug so that the cutting oil outlet and the pressurized air inlet of the oil supply tank are connected to the cutting oil inlet and the pressurized air outlet of the tool body, respectively.

4. A drilling device with an oil supply unit according to claim 3, wherein:

the tubular slide unit includes:
a slit extending along the longitudinal direction of the tubular slide unit;
a pair of fixing pieces extending radially outward so as to oppose each other across the slit; and,
a clamping unit having an operating member mounted on the pair of the fixing members and extending outward from one of the pair of fixing pieces, wherein, by operating the operating member, the fixing pieces are moved close to each other to fix the tubular slide unit to the column and are moved away from each other to enable the tubular slide unit to slide along the column; and, wherein the oil supply tank includes:
a tank body for storing cutting oil, the tank body being disposed so as to oppose the column across the fixing pieces; and,
a tank attachment member fixed to a lateral side of the tank body corresponding to an other of the pair of fixing pieces, the tank attachment member extending toward the tubular slide unit to be fixed to the tubular slide unit; and,
the socket is formed in the tank attachment member.

5. A drilling device with an oil supply unit according to claim 4, wherein:

the tool body includes a casing fixed to an upper end of the tubular slide unit, and an electric drill portion positioned on a side of the tubular slide unit diametrically opposite to a side on which the pair of fixing pieces are provided, the electric drill portion being vertically displaceable relative to the casing; and, the tubular slide unit has a guide groove to guide the electric drill portion in the vertical direction.

6. A drilling device with an oil supply unit according to claim 5, wherein:

the tubular slide unit includes a guide groove forming portion extending on the diametrically opposite side of the tubular slide unit with respect to the pair of fixing pieces and forming a guide groove; and, the tank attachment member is fixed to a lateral side of the guide groove forming portion.

7. A drilling device with an oil supply unit according to claim 6, wherein the tank body includes a portion disposed so as to oppose the tubular slide unit across the pair of fixing pieces, and an extending portion extending between the other of the pair of fixing pieces and the tank attachment member from the portion toward the guide groove forming portion.

8. A drilling device with an oil supply unit according to claim 2, wherein:

the tubular slide unit includes:
a slit extending along the longitudinal direction of the tubular slide unit;
a pair of fixing pieces extending radially outward so as to oppose each other across the slit; and,
a clamping unit having an operating member mounted on the pair of the fixing members and extending outward from one of the pair of fixing pieces, wherein, by operating the operating member, the fixing pieces are moved close to each other to fix the tubular slide unit to the column and are moved away from each other to enable the tubular slide unit to slide along the column; and, wherein the oil supply tank includes:
a tank body for storing cutting oil, the tank body being disposed so as to oppose the column across the fixing pieces; and,
a tank attachment member fixed to a lateral side of the tank body corresponding to an other of the pair of fixing pieces, the tank attachment member extending toward the tubular slide unit to be fixed to the tubular slide unit; and, the cutting oil outlet and the pressurized air inlet are formed in the tank attachment member.

9. A drilling device with an oil supply unit according to claim 8, wherein:

the tool body includes a casing fixed to an upper end of the tubular slide unit, and an electric drill portion positioned on a side of the tubular slide unit diametrically opposite to a side on which the pair of fixing pieces are provided, the electric drill portion being vertically displaceable relative to the casing; and, the tubular slide unit has a guide groove to guide the electric drill portion in the vertical direction.

10. A drilling device with an oil supply unit according to claim 9, wherein:

the tubular slide unit includes a guide groove forming portion extending on the diametrically opposite side of the tubular slide unit with respect to the pair of fixing pieces and forming a guide groove; and, the tank attachment member is fixed to a lateral side of the guide groove forming portion.

11. A drilling device with an oil supply unit according to claim 10, wherein the tank body includes a portion disposed so as to oppose the tubular slide unit across the pair of fixing pieces, and an extending portion extending between the other of the pair of fixing pieces and the tank attachment member from the portion toward the guide groove forming portion.

12. A drilling device with an oil supply unit according to claim 1, wherein:
the tubular slide unit includes:
- a slit extending along a longitudinal direction of the tubular slide unit;
- a pair of fixing pieces extending radially outward so as to oppose each other across the slit; and,
- a clamping unit having an operating member mounted on the pair of the fixing pieces and extending outward from one of the pair of fixing pieces, wherein, by operating the operating member, the fixing pieces are moved close to each other to fix the tubular slide unit to the column and are moved away from each other to enable the tubular slide unit to slide along the column; and wherein the oil supply tank includes:
- a tank body for storing cutting oil, the tank body being disposed so as to oppose the column across the fixing pieces; and,
- a tank attachment member fixed to a lateral side of the tank body corresponding to an other of the pair of fixing pieces, the tank attaching member extending toward the tubular slide unit to be fixed to the tubular slide unit; and, the cutting oil outlet is formed in the tank attachment member.

13. A drilling device with an oil supply unit according to claim 12, wherein:
the tool body includes a casing fixed to an upper end of the tubular slide unit, and an electric drill portion positioned on a side of the tubular slide unit diametrically opposite to a side on which the pair of fixing pieces are provided, the electric drill portion being vertically displaceable relative to the casing; and,
the tubular slide unit has a guide groove to guide the electric drill portion in the vertical direction.

14. A drilling device with an oil supply unit according to claim 13, wherein:
the tubular slide unit includes a guide groove forming portion extending on the diametrically opposite side of the tubular slide unit with respect to the pair of fixing pieces and forming a guide groove; and,
the tank attachment member is fixed to a lateral side of the guide groove forming portion.

15. A drilling device with an oil supply unit according to claim 14, wherein the tank body includes a portion disposed so as to oppose the tubular slide unit across the pair of fixing pieces, and an extending portion extending between the other of the pair of fixing pieces and the tank attachment member from the portion toward the guide groove forming portion.

* * * * *